Patented Dec. 18, 1951

2,579,007

UNITED STATES PATENT OFFICE 2,579,007

PROCESS FOR MODIFYING UNSATURATED HYDROCARBON DRYING OILS

Maurice J. Murray, Clarendon Hill, and William S. Gallaway, Western Springs, Ill., assignors to Universal Oil Products Company, Chicago, Ill., a corporation of Delaware No Drawing. Application May 29, 1948,
Serial No. 30,212

11 Claims. (Cl. 260—666)

This invention relates to a method of altering the physical characteristics of a particular type of hydrocarbon drying oil and especially the drying and film-forming properties thereof when exposed to atmospheric oxygen. More specifically, the invention concerns a process for contacting an unsaturated hydrocarbon type of drying oil, particularly the low boiling point fractions thereof containing hydrocarbon components of low molecular weight, with an active silica-containing catalyst to effect polymerization and isomerization of the hydrocarbon components of said drying oil whereby its drying properties are improved and the volatility of the oil is reduced.

General recognition by the art has been accorded the fact that certain types of unsaturated hydrocarbons, particularly polyolefinic types in which the double bonds are desirably in conjugated relationship to each other, possess film-forming properties on exposure to atmospheric oxygen in thin films. This so-called "drying" action which is believed to be similar to the behavior of unsaturated fatty acid glycerides on exposure to air essentially comprises a series of oxidation-polymerization reactions, forming as the ultimate film, a continuous high molecular weight polymer containing ketonic and peroxidic oxygen linkages. The ability of any particular hydrocarbon (and also a fatty acid ester) to undergo the "drying" transformation is dependent upon the unsaturation and molecular weight of the individual molecules comprising the drying oil. It has further been observed that those drying oils containing olefinic double bonds in conjugated relationship produce superior dried films in respect to hardness, toughness, abrasion resistance, weather resistance, adherence to the particular surface to which the drying oil is applied and also is an important factor in determining the drying rate of the oil and its ability to form a completely tack-free surface. Thus, within certain limitations, an increase in molecular weight and conjugated unsaturation of the component molecules comprising a drying oil mixture enhances the desirable drying properties thereof. This is especially true in regard to the hydrocarbon type drying oils where an increase in the molecular weight of the hydrocarbon drying oil components reduces the volatility of the oil and, therefore, permits a greater proportion of the drying oil components to undergo oxidation and polymerization on exposure to atmospheric oxygen. Hence, the molecular weight determines whether the drying oil will be lost by evaporation to the atmosphere or become fixed to the surface to which the oil is applied. The latter results in the formation of a thicker, more retentive film and provides a greater degree of protection to the surface per given quantity of the oil originally applied than in the case of the lower molecular weight drying oils or fractions thereof.

By means of the present process, hydrocarbon type drying oils may be treated in a particular manner and with a particular catalyst to effect an increase in the molecular weight of the drying oil hydrocarbon components without effecting any substantial and undesirable increase in the color thereof. The method herein provided is especially useful in the treatment of hydrocarbon oils containing a high proportion of low molecular weight components or in treating those fractions having low boiling points separated from the mass of original drying oil. The process or method of treatment presently provided also effects an apparent isomerization of the individual hydrocarbon components of the drying oil, not only as to the position of the double bonds present in the hydrocarbon molecules, but presumably, also in the degree of branching of the hydrocarbon structure. Observations have shown that the treatment effects a reduction in the volatility of the oil by an increase in the molecular weight of the hydrocarbon molecules, thereby increasing the proportion of film-forming components in the mixture of hydrocarbons, increasing the drying speed of the oil by isomerization of the double bonds within the hydrocarbon structure to positions of conjugated relationship to each other, and further, perhaps the most significant modification of the drying oil, the elimintaion of the tendency of said hydrocarbon drying oil to form a brittle film on exposure to atmospheric oxygen.

Broadly, the present invention comprises a process for enhancing the drying properties and utility of an unsaturated hydrocarbon drying oil by contacting said drying oil with an activated form of silica for a time and at a temperature sufficient to effect a modification in the molecular weight and other physical properties of the hydrocarbon components contained in said drying oil.

In accordance with one of its more specific embodiments, the present invention comprises a process for modifying a synthetic hydrocarbon drying oil comprising a mixture of hydrocarbon conjunct polymers having polyolefinic, cyclic structures in which the unsaturation is conjugated as well as non-conjugated and recovered from a catalyst-hydrocarbon sludge formed in a conjunct polymerization reaction, wherein said hydrocarbon drying oil is passed, in liquid phase, over or through a stationary bed of particles containing an activated form of silica at a temperature below about 200° C. and for a period of contact time sufficient to effect an increase in the molecular weight of said hydrocarbon drying oil components and an isomerization of the molecular structure of said hydrocarbons.

Other objects of the present invention and further embodiments thereof will be apparent in the following further description of the process of this invention.

The charging stock of the present process herein specified as a hydrocarbon type drying oil is characterized as a mixture of hydrocarbons of unsaturated structure, generally of relatively high molecular weight, above about 150, and usually of cyclic non-aromatic structure containing conjugated as well as non-conjugated unsaturation. Hydrocarbons of the above type having drying oil properties may be prepared by any suitable manner known to the art or may be derived from various natural sources, as in the case of certain terpene fractions. One of the preferred sources of hydrocarbon type drying oils which is especially suitable in the preliminary cobodying reaction because of its highly unsaturated structure in which the unsaturated bonds are in conjugation with each other are the catalyst-hydrocarbon sludges recovered from certain hydrocarbon conversion processes utilizing catalysts capable of causing conjunct polymerization of the hydrocarbon reactants charged thereto. Typical of the catalysts capable of causing said conjunct polymerization are the various Friedel-Crafts metal halides such as anhydrous aluminum chloride and aluminum bromide and certain members of the mineral acids, such as concentrated sulfuric acid, substantially anhydrous hydrogen fluoride and boron trifluoride, as well as others generally known to the art. The above catalysts when contacted with a hydrocarbon reactant, generally a non-aromatic hydrocarbon or hydrocarbon mixture, such as a mono- or polyolefinic and/or acetylenic hydrocarbon containing at least 3 carbon atoms per molecule or a branched chain paraffin at temperatures of from about $-10°$ to about 200° C., preferably from about 30 to about 100° C. and at pressures sufficient to maintain the reactants in substantially liquid phase, cause conjunct polymerization among the hydrocarbon reactants forming a sludge-like product containing catalyst-hydrocarbon addition complexes as a distinct reaction product of the process. Conjunct polymerization occurs in the mixture of catalyst and hydrocarbons by virtue of simultaneous polymerization, cyclization and hydrogen transfer reactions between the hydrocarbons to form relatively saturated hydrocarbons as one product of the reaction and an accompanying product comprising high molecular weight, polyolefinic, cyclic hydrocarbons, generally referred to in the art as conjunct polymers, containing from about 2 to about 4 double bonds per molecule in conjugated as well as non-conjugated relation to each other. The conjunct polymers, usually having a molecular weight of from about 250 to about 450 and in some cases up to about 1000, become bound by weak chemical bonds to the conjunct polymerization catalyst to form the sludge hereinabove referred to and may be released therefrom by special methods of decomposition, as for example, by heating the sludge in the presence of a sludge decomposition catalyst or in the presence of certain inert hydrocarbon diluents, by hydrolyzing the chemical bonds, as for example, by adding the sludge to water or to a dilute caustic, or they may be recovered by extraction or displacement with a solvent or a more reactive material. It is not the purpose nor is it essential here to describe the methods of producing sludge or recovering the hydrocarbon type of drying oil therefrom, but a description of the process relative to the use of substantially anhydrous hydrogen fluoride as conjunct polymerization catalysts (which forms a conjunct polymer hydrocarbon product having a maximum degree of conjugated unsaturation as compared to other conjunct polymerization catalysts and a product possessing the most desirable characteristics as a drying oil) will be referred to with accompanying details in the examples hereinafter provided.

The polyolefinic cyclic hydrocarbon product released by decomposition of a sludge formed in a conjunct polymerization reaction contains a series of high molecular weight compounds of generally homologous structure, the cyclic portions of the hydrocarbons having a cyclopentenyl structure in which the olefin bond of the cyclopentene ring is in conjugation with an olefinic bond present in an alkenyl or alkapolyenyl side chain. Infrared and ultraviolet absorption studies as well as other analytical data determined on the recovered conjunct polymers have shown that although the polyenes contained therein are cyclic, they are substantially non-aromatic, have isolated unsaturation in addition to conjugated unsaturation and that the 4 carbon atoms which constitute the conjugated system are highly substituted, possessing on the average fewer than 2 hydrogen atoms per alkapolyenyl group as substituents. Typical hydrocarbons present in the mixture of conjunct polymers or the original drying oil charging stock herein provided appear to have, among others, the following structure:

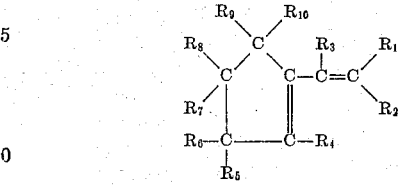

in which $R_1$—$R_{10}$ are hydrogen or hydrocarbon radicals selected from the group consisting of alkyl, alkenyl and alkapolyenyl radicals, and at least 2 of the groups $R_4$—$R_{10}$ are hydrocarbon radicals and not more than 2 of the groups $R_1$—$R_4$, are hydrogen.

The mixture of polyolefinic cyclic hydrocarbons or conjunct polymers has a wide boiling range of from about 150 to over 450° C., density of from about 0.83 to about 0.93, index of refraction of from about 1.47 to about 1.53, specific dispersion of from about 125 to about 175, bromine numbers above about 140 (although they vary considerably with the average molecular weight), maleic anhydride values of from about 30 to about 90, acid numbers below 3, average number of olefinic double bonds per molecule of from about 2.0 to about 4, of which from about 40 to about 70% are conjugated, and a molecular weight of from as low as 150 to as high as about 1000, the usual average being in the neighborhood of about 300.

The properties of the unsaturated hydrocarbon drying oils will, of course, vary depending upon whether the entire boiling range of material or a specific fraction is obtained for analysis, and generally the boiling range of the hydrocarbons will also determine the extent and type of modification in the structure thereof when subjected to the present treatment. In general, the lower boiling fractions have similar properties and are water-white to straw-yellow in color, while the higher boiling fractions are generally somewhat darker and may vary more widely in properties with differences in charging stock, conditions of preparation, etc. When the mixture of conjunct polymers as recovered from the sludge formed in a conjunct polymerization reaction is separated into specific fractions, the distillation is preferably effected at subatmospheric pressures, below about 50 mm. mercury absolute or by distillation in the presence of steam.

Although the entire mixture of conjunct polymers or polyolefinic cyclic hydrocarbons as recovered from a conjunct polymerization catalyst sludge may be utilized in the present process and the drying oil properties thereof advantageously enhanced by the treatment, the fraction boiling below about 300° C., and especially the fraction boiling below about 250° C., is particularly amenable to the present treatment and the modification in the properties of said low boiling fraction is particularly outstanding. The advantages of the present method of treatment are especially apparent in the low boiling fractions because of the increase in the molecular weight of the hydrocarbon components thereof and a consequent more pronounced reduction in the volatility of the fraction when utilized as a drying oil upon exposure to atmospheric oxygen. In thus specifying the fractions most advantageously effected by the present treatment, it is not intended to exclude the higher boiling fractions from the present process, since in the case of the latter higher molecular weight hydrocarbons, isomerization of the position of the double bonds contained in their molecular structure likewise enhances the drying properties of said higher boiling fractions. In the treatment of either type of charging stock, the treatment is effected without any substantial increase in the color of the hydrocarbon drying oils, as in the case of the heretofore known bodying treatments to effect modification in drying oils of the unsaturated type.

The silica-containing treating agent or catalyst herein specified for effecting a modification of a hydrocarbon type drying oil of the above specified properties and recovered from a conjunct polymerization catalyst sludge or derived from other sources, is selected from the various physically modified forms of silica derived from natural or synthetic sources in which the silica is of the absorptive or catalytically active type as contrasted to the non-adsorptive form of silica appearing naturally as sand, granite, etc. The siliceous materials which may be employed as catalysts in the present process are roughly divisible into 2 classes. The first class comprises materials of a predominantly siliceous character and includes the catalytically active forms of silica appearing in diatomaceous earth, kieselguhr and the synthetically prepared porous silica hydrogels. In the case of the naturally occurring active forms of silica, the catalyst may contain minor amounts of aluminum oxide and other elements such as sodium, potassium, calcium, etc., usually in small amounts. The synthetically prepared hydrogels may be prepared in such a manner that the ultimate product consists entirely of the hydrous silica gel by precipitation of silicic acid as a hydrosol from an aqueous solution of a soluble silicate compound. The hydrosol subsequently undergoes molecular rearrangement to the solid, semi-rigid hydrogel stage, the transformation being a function of time and pH. The hydrated forms of silica may be prepared in accordance with any convenient procedure known to the art, but the method comprising hydrolysis of an alkali silicate, such as sodium silicate (the common water glass), by acidification of an aqueous solution thereof is one of the methods commonly employed and preferred by the art. The gel may also be prepared by hydrolysis of an organic silicate ester, such as ethylorthosilicate, in an aqueous medium. The precipitated silica gel is thereafter filtered from its aqueous suspension or otherwise separated therefrom, dried and broken up into particles for utilization in the present treatment; alternatively, the silica hydrosol, while in the fluid state, may be comminuted into fluid droplets and while in such state of subdivision, suspended in a suitable fluid of lower density, such as an oil, air, etc. for a period of time sufficient to allow the hydrosol droplets to undergo transformation to the semi-solid hydrogel state. The latter method provides essentially spherically shaped particles of silica hydrogel and may be the preferred form of the silica treating agent, because of the many advantages, especially as to flow mechanics, associated with particles in spherical form. The present method of treatment may also be effected with the aid of certain hydrocarbon conversion catalysts containing silica (as the hydrogel) such as a spent alumina-silica synthetic composite originally employed, for example, in a petroleum cracking process. The group of catalysts also includes other silica-refractory metal oxide composites such as a silica-magnesia catalyst. One of the preferred catalysts containing silica utilizable in the present process is the silica-phosphoric acid composite known to the art as "a solid phosphoric acid catalyst," which is believed to contain a "silico phosphate" compound or combination of the silica and phosphoric acid components, commonly utilized in olefinic hydrocarbon polymerization reactions. The latter type of silica-containing catalyst may be used in either its original, as prepared, condition or in its "spent" condition as removed from a hydrocarbon conversion process in which the silica-containing catalyst is of low activity.

The second class of materials which may be employed either alone or in conjunction with the first class comprises generally certain members of the class of active aluminum silicates including such naturally occurring substances as the various fuller's earths and clays such as bentonite, montmorillonite and others as well as the so-called acid-treated clays prepared by washing naturally occurring clays with hydrochloric or other mineral acids.

The silica-containing treating agent herein specified, is generally maintained in a vessel, such as a perpendicular tower, in the form of solid particles which may be piled in thin layers on trays or merely packed into the treating vessel as a mass of solid particles distributed in such a manner as to allow the liquid hydrocarbon drying oil charging stock to flow from one end of the treating tower to the other. On occasion, for example, after continued use of the catalyst, when the isomerization-polymerization effects herein specified are no longer manifest in a hydrocarbon drying oil which has been subjected to the treatment, the silica-containing catalyst may require regeneration to restore it to its original, active form. In the regeneration treatment, the catalyst may be eluted, for example, with benzene, water, a low molecular weight aliphatic alcohol, such as ethanol, etc., and subsequently dried, or the silica-containing particles may be heated in the presence of oxygen to burn off hydrocarbonaceous deposits accumulating on the surface of the catalyst during the treatment and which are believed to be the cause of the deactivation.

The present isomerization - polymerization treatment of a hydrocarbon drying oil is effected at temperatures below about 200° C., preferably at temperatures of from about −10° to about 125° C. Although no absolute lower temperature limit has been observed, beyond which the effects herein observed have not been obtained, the treatment becomes sluggish at temperatures below about −10° C., while at temperatures higher than 200° C., the charging stock undergoes extensive and deleterious cracking reactions, resulting in a product containing a higher percentage of low molecular weight hydrocarbons than is usually desired. At temperatures lower than −10° C., however, the product tends to acquire a higher molecular weight than at higher temperatures in accordance with the usual observations of low-temperature polymerization, and it may be desired under some conditions to operate at temperatures lower than −10° C. for the above reasons. The present conversion proceeds instantaneously on contacting the charging stock with the silica-containing catalyst and the extent of conversion on instantaneous contact is dependent upon the temperature employed. It is generally preferred to employ contact periods of from about 10 minutes to 2 or more hours, allowing equilibrium conditions in the transformation to obtain, and enabling the desired effects of low temperature conversion to be utilized. The long contact periods may be effected by merely permitting the hydrocarbon drying oil to stand quiescent in contact with the silica-containing catalyst, or the transformation may be effected by permitting the drying oil to flow through an elongated conversion zone packed with the silica-containing catalysts, as for example, a long pipe in which the catalyst particles are fixed in layers, or merely packed in as a mass. The conversion temperature may be maintained at different values in separate portions of the reactor.

The invention is further illustrated in the following examples which indicate the present treatment with reference to a particular charging stock, catalyst and reaction conditions; these factors, however, are not intended to be limited in accordance with the values specified in the examples and furthermore, it is not intended by the recitation of the above factors in the following examples to limit their generally broad scope within the values herein set forth in the above specifications.

Example I

A synthetic hydrocarbon type of drying oil containing a mixture of conjunct hydrocarbon polymers was prepared by the following reaction: An octene fraction of a copolymer gasoline (the product of the mixed polymerization of propylene and butylene monomers) was reacted with hydrogen fluoride to form a sludge phase and a relatively saturated hydrocarbon phase. In this reaction, 22 liters (16.5 kg.) of the gasoline (having a bromine number of 162 and containing mono-olefinic hydrocarbons varying in molecular weight from octene to dodecylene) was charged into a pressure autoclave and rapidly stirred as 9.0 kg. of liquid anhydrous hydrogen fluoride was introduced into the reactor. The pressure was maintained at approximately 205 pounds per square inch and the temperature was about 91° C. as stirring was continued for a reaction period of approximately 1 hour. The upper saturated hydrocarbon phase was decanted from the lower acidic sludge layer which weighed 6.1 kg. or a yield, based on the total charge, of 63%.

5000 grams of the above sludge was allowed to flow into a mixture of ice and water, additional ice being added as the heat of reaction melted the ice in the hydrolyzing reactor. 2170 grams of a light-colored, sweet-smelling oil separated from the aqueous phase, a yield of 42.2%, based on the weight of original olefin charged. An examination of the oil indicated the following properties:

| | |
|---|---|
| Boiling range | 160° to above 400° C. |
| Density $d_4^{20}$ | 0.863 |
| Color, Gardner | 12–13 |
| Molecular weight, average | 304 |
| Diene number | 85 |
| Bromine number | 195 |
| Double bonds/molecule, average | 3.2 |

Although the above hydrocarbon conjunct polymer was prepared from a hydrogen fluoride sludge and was recovered therefrom by an aqueous hydrolysis procedure, a similar material may be obtained from aluminum chloride or sulfuric acid sludges and the conjunct hydrocarbon polymers may also be recovered from the hydrogen fluoride sludge by thermal decomposition methods, as for example, by flash distillation of the hydrogen fluoride from the residual conjunct polymers.

The mixture of conjunct hydrocarbon polymers as prepared above was modified in accordance with the process of the present invention by the following procedure. A fraction boiling from about 200° to about 225° C. was separated from the mixture of conjunct polymers and was contacted with one-half its volume of a powdered synthetic silica-alumina hydrocarbon cracking catalyst containing 8.2% alumina. The hydrocarbon mixture, originally at room temperature, heated spontaneously to 60° C. and the silica-alumina particles acquired a brilliant red color. After 15 minutes, the mixture was filtered and the hydrocarbons recovered from the catalyst. An ultra-violet absorption spectra examination of the recovered hydrocarbons indicated that the silica-alumina treated hydrocarbon mixture had a specific extinction coefficient (E max.) at 248 m$\mu$ of 31.4 compared to E max. of 44.9 for the charge. The catalyst was treated with 95% ethanol, displacing a dark colored oil having an E max. at 248 mμ of 28.5. Both recovered hydrocarbon products possessed an odor different than the charge and distillation of the non-adsorbed product indicated that the hydrocarbons subjected to treatment underwent an increase in molecular weight as evidenced by the increase in boiling point of the fraction. The following data were obtained on distilling the recovered hydrocarbons at 760 mm. pressure.

| Boiling Point, °C. | Per Cent Over |
|---|---|
| 155 | Initial B. P. |
| 185 | 5.0 |
| 210 | 36.0 |
| 226 | 67.1 |
| 250 | 78.0 |
| 300 | 79.8 |
| 335 | 86.4 |
| 348 | 97.8 |
| bottoms | 2.2 |

The results indicate that substantially no cracking was obtained in the treatment, since only 5% of the material boiled below the initial boiling point of the fraction treated, although 33% of the material boiled above the boiling range of the charge subjected to treatment.

*Example II*

The 190–200° C. cut of the cyclic, polyolefinic hydrocarbon product of Example I was passed at a liquid hourly space velocity (designating the volume of charge per hour per volume of catalyst) of 0.5 through a column of solid phosphoric acid particles (a calcined composite of kieselguhr and pyrophosphoric acid prepared in accordance with the process described in U. S. Patent No. 2,120,702) maintained at a temperature of 100° C. No gas was evolved and the product was a light-colored effluent of medium viscosity. The customary infra-red absorption bands of the initial charging stock were weaker at 1620, 1640 and 850 cm.$^{-1}$. The product distilled over at atmospheric pressure in accordance with the following range of boiling points:

| Cut Number | Boiling Point, °C. | Percent Over |
|---|---|---|
| 0 | 181 | Initial B. P. |
| 1 | 196 | 11.1 |
| 2 | 199 | 22.2 |
| 3 | 200 | 33.4 |
| 4 | 202 | 44.5 |
| 5 | 202 | 55.6 |
| 6 | 205 | 66.7 |
| 7 | 322 | 77.8 |
| 8 | 340 | 88.9 |
| 9 | 359 | 98.6 |
| Bottoms | | 1.4 |

The high boiling product did not evaporate on exposure to the atmosphere at approximately room temperature and dried to a hard, water-resistant film.

We claim as our invention:

1. A process for improving a drying oil comprising a mixture of cyclic, polyolefinic hydrocarbons recovered from a catalyst-hydrocarbon sludge formed in a conjunct polymerization reaction which comprises contacting said drying oil with a catalyst containing adsorptive silica at reaction conditions suitable for effecting isomerization-polymerization of said hydrocarbon components.

2. The process of claim 1 further characterized in that a fraction of said mixture of cyclic polyolefinic hydrocarbons boiling from about 150° to about 300° C. is subjected to the action of said silica-containing catalyst.

3. The process of claim 1 further characterized in that a fraction of said mixture of cyclic polyolefinic hydrocarbons boiling from about 150° to about 250° C. is subjected to the action of said silica-containing catalyst.

4. The process of claim 1 further characterized in that said silica-containing catalyst comprises a silica-alumina composite comprising predominantly silica.

5. The process of claim 1 further characterized in that said silica-containing catalyst comprises a solid silica-phosphoric acid composite containing silico phosphate compounds.

6. The process of claim 1 further characterized in that said silica-containing catalyst comprises a siliceous clay.

7. The process of claim 1 further characterized in that said cyclic polyolefinic hydrocarbons are contacted with the silica-containing catalyst at a temperature below about 200° C. and at a pressure sufficient to maintain substantially liquid phase.

8. The process of claim 1 further characterized in that said mixture of cyclic polyolefinic hydrocarbons is contacted with said silica-containing catalyst at a temperature of from about −10° to about 125° C.

9. A process for reducing the volatility of a hydrocarbon drying oil comprising a mixture of cyclic polyolefinic hydrocarbons recovered from a hydrogen fluoride conjunct polymerization catalyst sludge, said process increasing the molecular weight of the hydrocarbon components of said drying oil, which comprises contacting said drying oil at a temperature of from about −10° to about 125° C. with a catalyst containing adsorptive silica at a pressure sufficient to maintain substantially liquid phase for a contact period sufficient to effect isomerization-polymerization of said cyclic polyolefinic hydrocarbons and separating the converted hydrocarbons from the catalyst.

10. The process of claim 9 further characterized in that said contact period is from about 10 minutes to about 2 hours.

11. A process for improving the drying and film-forming properties of a drying oil comprising a mixture of cyclic, polyolefinic hydrocarbons recovered from a catalyst-hydrocarbon sludge formed in a conjunct polymerization reaction and containing hydrocarbons boiling below about 300° C., which comprises subjecting said drying oil to polymerization and isomerization in the presence of a catalyst containing adsorptive silica at a temperature below about 200° C.

MAURICE J. MURRAY.
WILLIAM S. GALLAWAY.

REFERENCES CITED

The following references are of record in the file of this patent:

UNITED STATES PATENTS

| Number | Name | Date |
|---|---|---|
| 2,131,195 | Schneider et al. | Sept. 27, 1938 |
| 2,368,110 | Buell | Jan. 30, 1945 |
| 2,400,521 | Kuhn | May 21, 1946 |
| 2,401,865 | Gorin et al. | June 11, 1946 |
| 2,404,340 | Zimmerman | July 16, 1946 |
| 2,440,477 | Johnstone | Apr. 27, 1948 |
| 2,481,498 | Carnell | Sept. 13, 1949 |